March 30, 1965  D. J. BUNGER  3,175,804
RADIAL-FLOW TURBINE SAFETY
Filed April 1, 1963
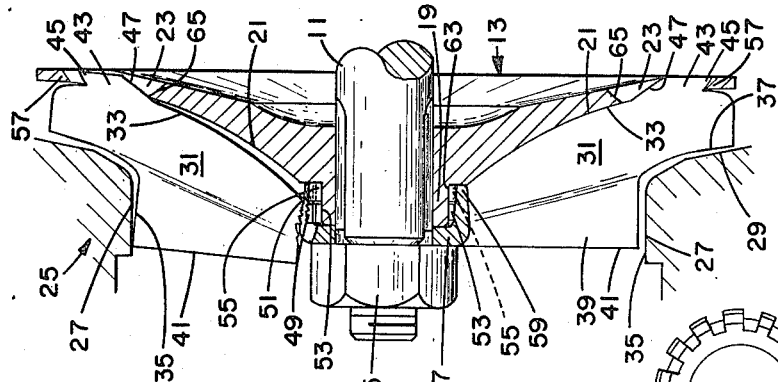
Fig. 1
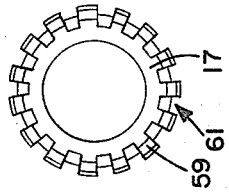
Fig. 6
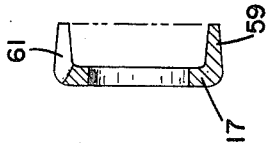
Fig. 5
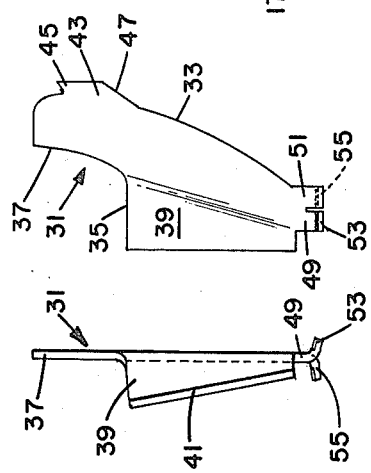
Fig. 4
Fig. 3
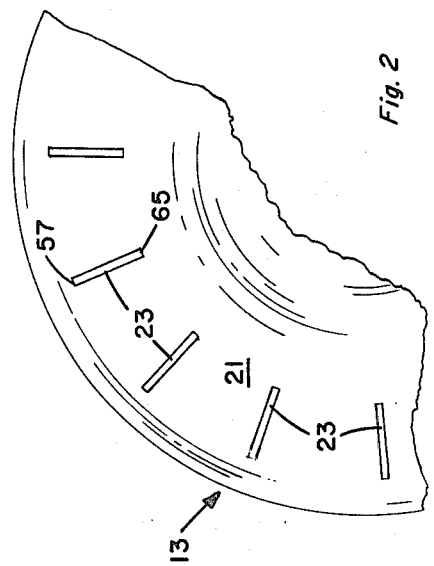
Fig. 2
INVENTOR.
DENNEN J. BUNGER
BY
Robert W. Ely
ATTORNEY

3,175,804
RADIAL-FLOW TURBINE SAFETY
Dennen J. Bunger, Whitesboro, N.Y., assignor to The Bendix Corporation, Utica, N.Y., a corporation of Delaware
Filed Apr. 1, 1963, Ser. No. 269,436
3 Claims. (Cl. 253—77)

This invention relates to turbines and more particularly concerns providing safety in radial-flow turbines.

An object of the present invention is to provide an improved radial-flow turbine which does not disintegrate in an uncontrolled manner upon the turbine wheel rotating at an excessive speed after a control failure.

A further object is the provision of an improved radial-flow turbine wheel which has releasable blades actuated by centrifugal force acting through a peripheral pivot at a speed less than runaway speed at which a turbine tends to disintegrate.

Another object is to provide an improved radial-flow turbine wheel comprised of a turbine disc having a hub and blades firmly attached to the disc by a pivotable peripheral connection and a severable hub connection whereby a blade is released at a predetermined speed.

An additional object is the provision of a radial-flow turbine comprised of a containment shroud and a turbine wheel which includes blades attached to a turbine disc at the periphery by pivot arrangement and at the disc hub by shear means whereby a blade is released at a predetermined speed and pivots into the shroud to render the turbine inoperative.

The realization of the above objects along with the features and advantages of the invention will be apparent from the following description and the drawing in which:

FIGURE 1 is a side cross-sectional view of a radial-flow turbine incorporating the invention and shows (in the lower half) the turbine arranged for normal operation and (in the upper half) the controlled-failure operation with a turbine blade pivoted and released, FIGURE 2 is plane view of a segment of the upstream side of the turbine wheel disc and shows the plurality of openings for receiving pointed pivot tabs of the blades, FIGURE 3 is plane view of a turbine blade viewed from the upstream direction and shows reversely-bent, laterally-extending projections for use in retaining at the inner part the blades, FIGURE 4 is plane side view of the blades and shows the pivot tab near the upper or outer left part of the blade, FIGURE 5 is a side cross-sectional view of the lock ring which fits over the blade projections, and FIGURE 6 is a plane view of the lock ring and shows axially-extending fingers with slots between the fingers.

Referring to FIGURES 1–6 of the drawing, a turbine wheel shaft 11 extends through and is splined to a turbine wheel disc 13. A nut 15 is threaded on the end of shaft 11 and abuts and positions a lock or restraint ring 17 against and over the hub part 19 of the turbine wheel disc 13. The disc 13 has a radially-outwardly-diverging surface 21 and a ring or plurality of equally-spaced openings 23 in the peripheral portion thereof as shown in FIGURE 2. Housing or shroud 25 has a first part providing an annular axially-extending surface 27 and a second part providing an outwardly-diverging surface 29.

The radial-flow turbine blades 31 have an edge 33 fitted (see lower half of FIGURE 1) along the diverging surface 27 of the disc 13 and extend generally adjacent to the two surfaces 27 and 29 of the housing or shroud 25. Each blade 31 has an axially-extending edge 35 and radially-outwardly-diverging edge 37. Edge 35 is part of the inclined upstream portion 39 which has generally-radially-extending upstream edge 41 (note FIGURES 3 and 4).

The blades 31 also have axially-extending pivot tabs or lugs 43 which include a pointed outer part 45 and a radially-outwardly-inclined inner edge 47. At the bottom of each blade 31, there are two attachment extensions 49 and 51 respectively having lateral projections 53 and 55 reversely directed or oppositely-extending.

In FIGURE 1 (lower half), it can be seen how the blades 31 are fitted into and on the turbine wheel disc 13 by having pivot tabs 43 extending or hooked into the longer disc openings 23 and with blade edges 33 extending along surface 21 of the turbine wheel disc 13. It is to be noted that the notch formed by the peripheral edge of the blade and the pointed part 45 of tab 43 fits against the pointed outer lateral edge 57 of opening 23. The blades 31 are releasably attached or locked in position by means of lock ring 17 which has axially-extending fingers 59 and slots 61 therebetween (See FIGURES 5 and 6). The fingers 59 fit over reversely-bent projections 53 and 55 with upper part of extensions 49 and 51 received in slots 61 to provide restraint to radially-outward movement until a predetermined speed causes the blades 31 having the necessary center of gravity to rupture or shear extensions 49 and 51 with pivoting at the fulcrum point of pointed edge 57. Projections 51 and 53 are received in annular recess 63 of the hub part 19 of the turbine wheel disc 13 with the ends of fingers 59 abutting the radial wall of the recess 63. Lock ring 17 is positioned by nut 15, as previously described. It is to be noted that, after a blade 31 has been released and pivots with outward movement, that the inclined edge 47 of pivot tab 43 which remains integral will ride on the inner lateral edge 65 of disc openings 23 to urge the blade outwardly with drag at shroud 25. As shown in the bottom half of FIGURE 1, the innermost terminal part of the inclined edge 47 is spaced from the lateral edge 65 of opening 23.

The operation of the controlled failure, radial-flow turbine of the present invention can be understood by reference to the lower and upper halves of FIGURE 1.

The normal positioning is shown in the lower half of FIGURE 1 and shows the blade retention when the turbine is operating below a predetermined speed without a condition approaching disintegration of the turbine wheel. The cooperation at tab 45 and inclined or pointed edge 57, at disc surface 21 and blade edge 33, and at blade extensions 49 and 51 with lateral projections 53 and 55 and lock ring fingers 59 and slots 61 gives a sturdy turbine wheel reliably operable at normal speeds.

Assuming the turbine wheel approaches the predetermined speed (well below disintegrating speed) due to a control failure, the centrifugal force developed by the blade 31 (considered as a free body) during rotation will act through the mass center of the blade (center of gravity). The contact point between the lateral edge 57 of the opening 23 in the turbine disc 13 and the notch at pointed edge 45 of the pivot tab 43 of the blade 31 becomes a fulcrum point of a pivot arrangement and a reaction is established by the retention means (projections 53 and 55 and lock ring fingers 59) for resisting the centrifugal force acting through the center of gravity of the blade. The sections of blade extensions 49 and 51 are designed to resist a predetermined maximum reaction and will fail when a predetermined speed generates the excessive force.

Upon failure of shear extensions 49 and 51 sections at the predetermined speed, the blade 31 will then rotate outwardly about the fulcrum point at lateral edge 57 disrupting normal flow until it contacts the containment shroud 25 which is designed to resist the loading from the released blades 31. The rubbing released blade 31 dissipates energy with its axial edge 35 (aided by tab edge 47 riding on disc edge 65) dragging on shroud surface 29. The first-released blade 31 is pulled from the disc 13 by the drag and the rotation of the turbine wheel.

The released blade (relatively not rotating and in some instances, jammed and dragged) collides with the other blades causing them to be pulled from the wheel and jammed, thereby further slowing down the turbine due to ineffective gas flow and frictional drag. This action constitutes a controlled failure at a predetermined speed with turbine operation interference and energy dissipation before any dangerous speed is reached which previously occurred at a high energy level causing turbine wheel disintegration.

It is to be understood that persons skilled in the art can make changes in the disclosed device without departing from the invention as set forth in the appended claims.

What is claimed is:

1. A radial-flow turbine adapted to fail safely at predetermined speed with containment of released blades comprised of:
   a containment housing providing an annular axially-extending wall and radially-outwardly-diverging annular wall,
   a turbine wheel disc having an annular radially-outwardly-diverging surface facing toward said radially-outwardly-diverging wall of said housing,
   said turbine wheel disc having a hub and a plurality of radially-extending openings adjacent the disc periphery with said openings each having pointed lateral edge at the diverging surface of said turbine wheel disc,
   a plurality of radial-flow turbine blades having pivot tabs each mounted with its tab inserted in said peripheral disc openings and hooked on said pointed lateral edge to provide positioning and a pivot arrangement,
   said blades extending from said disc diverging surface to adjacent said axially-extending wall and said diverging wall of said housing to provide shroud edges,
   said turbine blades having radially-extending inlet edges providing with said shroud edges inlet corners,
   the radially-inner parts of said blades being connected to said hub of said turbine wheel disc by frangible means, and
   each of said blades, the pivot arrangement of its pivot tab and said frangible means being constructed and arranged so that, when said turbine wheel rotates above a predetermined speed, a blade will be released and pivot against said housing.

2. The invention according to claim 1 and being further characterized by:
   said openings of turbine wheel disc each having an inner lateral edge, and
   the radially-inner edge of each of said blade pivot tabs being inclined radially-outwardly in a downstream direction for urging a released blade outwardly against said housing whereby the released blade inlet corner will drag aaginst the containment housing.

3. A radial-flow turbine wheel adapted to fail safely at predetermined speed comprised of:
   a turbine wheel disc having an annular radially-outwardly-diverging surface and hub,
   said turbine wheel disc having a plurality of radially-extending openings adjacent the disc periphery with each of said openings having pointed edge at the diverging surface of said turbine wheel disc,
   a plurality radial-flow turbine blades having pivot tabs with each blade mounted with its tab in said peripheral disc openings to provide a pivot arrangement and each blade extending along said disc diverging surface,
   each blade including two inner extensions having two oppositely-laterally-extending attachment projections,
   a lock ring having axially-extending fingers at each side of said blades and fitted over said blade attachment projections,
   a driven shaft extending through said turbine wheel disc and splined thereto, a nut threaded on said shaft and positioning said lock ring by abutment therewith,
   said turbine wheel disc hub having an annular recess receiving said blade attachment projections,
   said blade attachment projections operative to connect said blades to said hub during normal operating turbine speeds and further operative to break at a predetermined high turbine speed due to blade centrifugal force, and
   said blades operative on breaking of said projections to pivot about said pivot arrangement.

References Cited by the Examiner
UNITED STATES PATENTS

| | | | |
|---|---|---|---|
| 1,469,045 | 9/23 | MacMurchy | 253—77 |
| 1,535,417 | 4/25 | Huff | 230—134.45 |
| 2,392,858 | 1/46 | McMahan | 230—134.45 |
| 2,828,190 | 8/58 | Barr | 230—134.45 |

FOREIGN PATENTS

| | | |
|---|---|---|
| 624,166 | 7/61 | Canada. |
| 28,742 | 1907 | Great Britain. |

JOSEPH H. BRANSON, Jr., *Primary Examiner.*